April 2, 1963  E. J. BRUTTEN ETAL  3,083,682

FINGERPRINTING APPARATUS

Filed June 26, 1961　　2 Sheets-Sheet 1

Eugene J. Brutten
Burl B. Gray
Farrell E. Rose,
　　Inventors.
Koenig, Pope, Senniger & Powers,
　　Attorneys.

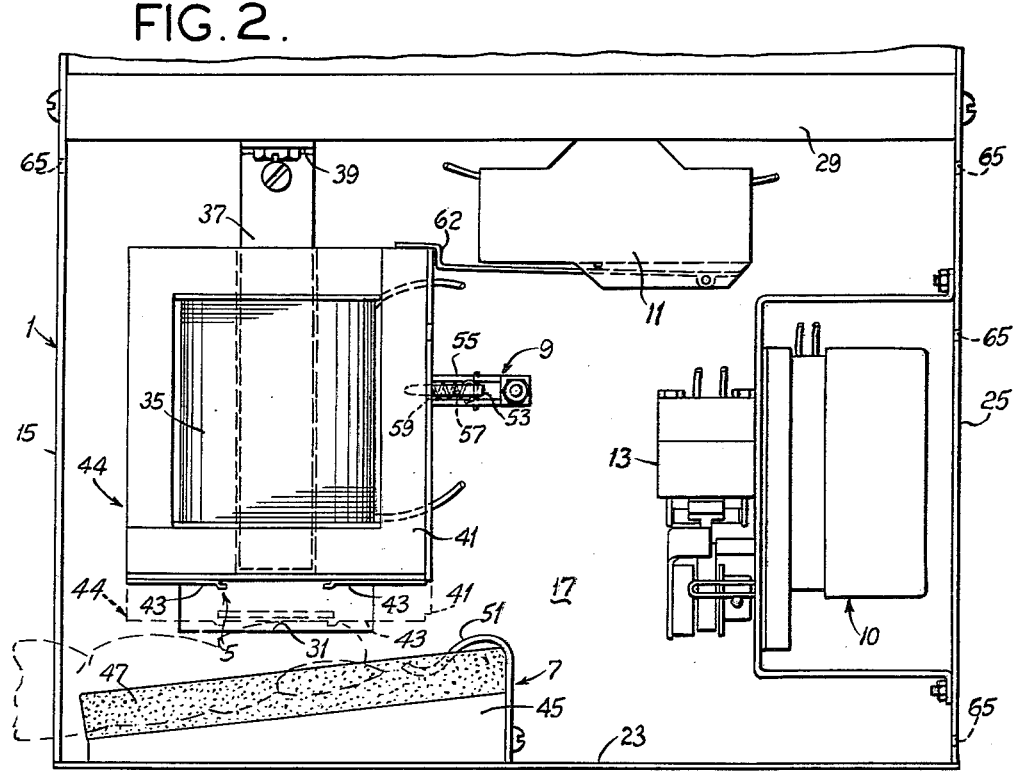
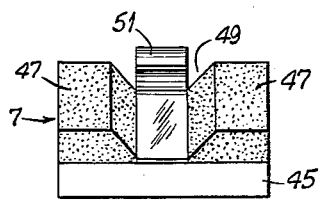

3,083,682
FINGERPRINTING APPARATUS
Eugene J. Brutten, Burl B. Gray, and Darrell E. Rose, Carbondale, Ill., assignors to Southern Illinois University Foundation, Carbondale, Ill., a corporation of Illinois
Filed June 26, 1961, Ser. No. 119,517
10 Claims. (Cl. 118—31.5)

This invention relates to fingerprinting apparatus and more particularly to novel apparatus for recording fingerprints on a strip of translucent material, such as film, the densities of which fingerprints are to be subsequently measured in the so-called palmar sweat method of measuring anxiety.

As noted in co-assigned application Serial No. 154,467, filed November 24, 1961, entitled Measurement of Fingerprint Density Apparatus and Method behavioral scientists have been concerned with devising an objective measure of anxiety. To this end, it was discovered that sensory stimuli indicative of anticipatory apprehension provoked fingertip sweating without affecting a change in general bodily sweating.

This led to the development of a discrete and objective index for measuring anxiety. Procedurally, this measure is based upon the chemical reaction which obtains when perspiration soluble anhydrous ferric chloride, applied to the palmar side of the fingertips, is brought into contact with a tannic acid bearing agent such as a strip of film containing a uniform emulsion saturated with tannic acid. Since the reaction of the anhydrous ferric chloride and tannic acid produces an ink fingerprint which is a dependent function of the extent of fingertip perspiration, the resulting darkness of the print is considered indicative of the degree of anxiety.

Heretofore, one type of device for obtaining palmar sweat prints included a plate spring-biased upwardly. A strip of film was placed on the plate and the palmar portion of the finger was pressed down on the film. The spring would yield under the finger pressure and at a certain pressure point, for example two pounds pressure, the film carrying plate would engage a stop, thereby giving the operator an indication that sufficient pressure had been applied. After a certain time interval, for example two minutes, the operator removed his finger from the film, leaving a fingerprint thereon. The density or darkness of the fingerprint was then measured to give an indication of the degree of anxiety.

Considerable difficulty has been encountered with fingerprints produced by this type of fingerprinting device. First, there was no assurance that different operators would push down the film carrying plate with the same pressure, i.e., the density of the fingerprint produced by a person pressing down on the plate with more than the required pressure might differ from the density of the fingerprint produced by a person pressing down on the plate with just the right amount of pressure, although the anxiety of the two persons might be nearly the same. Second, since both the finger and film carrying plate had to be moved to obtain a print, the prints were often smudged and thus rendered inaccurate or useless. It was also difficult for the operator to maintain his finger against any movement during the complete two minute period. In essence, the usefulness of the fingerprints obtained by this type of device is primarily subject to the operating procedure used by each different operator, and it is difficult to obtain uniform results. The present invention provides apparatus which overcomes the stated difficulties and gives accurate, uniform results.

Among the several objects of the invention, therefore, may be noted the provision of apparatus for accurately and objectively recording fingerprints on film or the like for use in measuring anxiety in the practice of the palmar sweat method; the provision of such apparatus in which the same degree of pressure is applied to the print receiving material irrespective of the person operating the apparatus; the provision of apparatus of this type which may readily be made portable; and the provision of such apparatus which is of relatively simple construction and easy to operate. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is an isometric broken-apart view of apparatus of the present invention with the electrical wiring removed for clarity;

FIG. 2 is a side view in elevation of the apparatus with certain parts removed for clarity;

FIG. 4 is an end view of the finger guide of apparatus of the invention; and

Corresponding reference characters indicate corresponding parts throughout the several views of the drawings.

Figure 1:
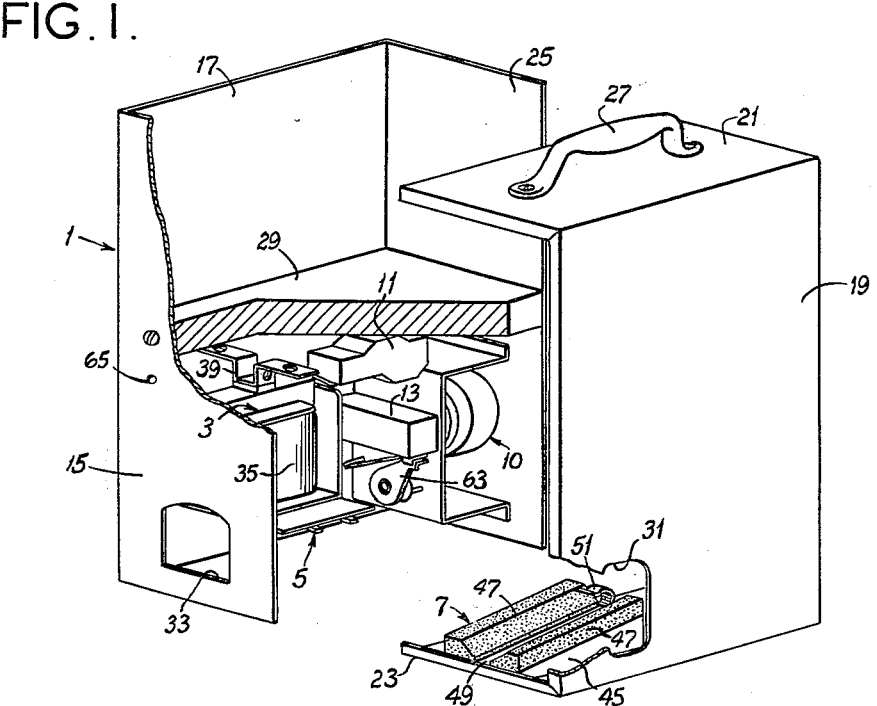

Referring now more particularly to the drawings, an apparatus for recording fingerprints on film or the like in accordance with the present invention is shown to comprise a frame or housing 1 in which are located a solenoid 3, a film or translucent material holder 5 and a finger positioning guide 7. A releasable latch 9 is provided for holding the solenoid 3 and film holder 5 from movement toward the finger guide 7. A variable electric timer 10 and associated switches 11 and 13 are provided to control the energization of solenoid 3. It is to be understood that the term "film" as used herein refers to all types of translucent material upon which a fingerprint may be recorded.

Housing 1 includes a front wall 15, two side walls 17 and 19, a top cover 21, a base 23, and a rear wall 25. For ease of assembly and disassembly, the housing is formed in two pieces, a channel-shaped portion constituted by front wall 15, side wall 17, and rear wall 25, and a channel-shaped flanged portion constituted by side wall 19, top cover 21, and base 23. A handle 27 is secured to top cover 21 for carrying the apparatus. Mounted within housing 1 is an intermediate board or plate 29. The side walls are provided with openings 31 and the front wall is provided with an opening 33, the purpose of these openings being described hereinafter.

Solenoid 3 conventionally comprises a coil 35 and an armature plunger 37. A bracket 39 rigidly connects the plunger 37 to the bottom side of board 29. Coil 35 is mounted within a coil frame 41. Film holder 5 comprises two film clips 43 secured to the bottom of frame 41 for holding a strip of film. Thus, the coil 35, frame 41, and film holder 5 form a unitary structure generally designated 44. This unitary structure is adapted for movement between a retracted (raised) position (as shown in solid lines in FIG. 2) and a fingerprinting (lowered) position (as shown in dotted lines in FIG. 2).

Finger postioning guide 7 comprises a wedge-shaped block 45 on the upper surface of which are mounted two sponge rubber strips 47. These strips are positioned so as to provide a channel-shaped groove 49 into which a finger may be placed. A lip 51 is located at the inner end of groove 49 for holding a finger in a position such that only the palmar portion of the finger will be aligned with a film strip carried by the film holder 5 and any upward movement of the finger is substantially prevented, i.e., the tip of the finger is pressed against lip 51 and the fingernail extends under lip 51.

Figure 3:
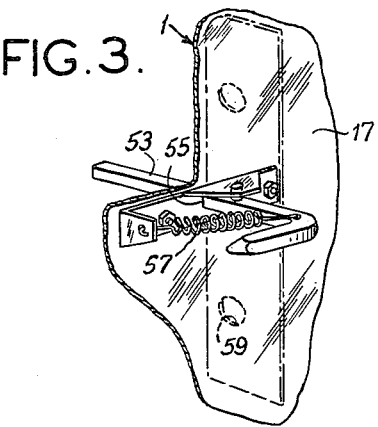
FIG. 3 is a perspective view of a latching mechanism of apparatus of the invention.

Latch 9 (FIG. 3) comprises an L-shaped lever 53 pivotally attacched to wall 17 and extending out through an opening 55 therein. The inner end of lever 53 is biased toward coil frame 41 by a spring 57. Coil frame 41 is provided with an opening 59 vertically aligned with the inner end of lever 53. Opening 59 is so located that when unitary structure 44 is in a raised or retracted position the inner end of lever 53 will be biased into the opening 59, thereby latching unitary structure 44 in a retracted position. When the lever 53 is pivoted counterclockwise as viewed in FIG. 3, the inner end of the lever is withdrawn from the opening 59 and unitary structure 44 falls due to gravity. Upon energization of the coil 35 of the solenoid 3, unitary structure 44 moves upward on the plunger 37 until the inner end of lever 53 is biased into hole 59, thereby latching unitary structure 44 in retracted position.

Figure 5:
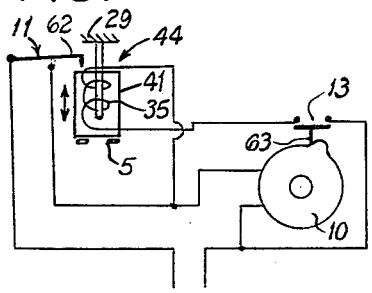
FIG. 5 is an electrical circuit diagram of apparatus of the invention.

When unitary structure 44 is released from its latched or retracted position, a switch arm 62 of switch 11 moves downward and closes switch 11, closing a circuit through timer 10 (see FIG. 5). After a predetermined period of time, for example two minutes, has elapsed following the release of unitary structure 44, the timer 10 causes a switch-closing arm 63 to close switch 13, thereby closing a circuit through coil 35. Closing of this circuit causes unitary structure 44 to be rapidly pulled upward from the finger guide 7. During its upward movement, the frame 41 is adapted to engage and raise arm 62 thereby deenergizing both the solenoid 3 and the timer 10 just as lever 53 becomes horizontally aligned with opening 59. Timer 10 is of the type which automatically resets itself upon deenergization, thereby opening switch 13. It will be understood that the size of the solenoid may be varied and a suitable resistor or resistors installed in the circuit without varying from the scope of this invention.

Operation is as follows:

A strip of film having a clear area and a fingerprint receiving area is fed through either of the openings 31 into the film holder 5. It will be understood that individual strips of film may be used or, if desired, a roll or continuous strip can be used and drawn through the film holder to record a series of individual fingerprints. The person having his fingerprint recorded inserts one finger, for example an index finger, through opening 33 in front wall 15 into the groove 49 of finger guide 7 with the palmar part of the finger facing upwardly. The finger is pressed against lip 51 with the fingernail and tip of the finger under lip 51 thereby exposing the palmar portion of the finger and preventing upward movement thereof. The shape of groove 49 restricts lateral movement of the finger to avoid possible smudging due to movement. Lever 53 is then pivoted to disengage the inner end thereof from coil frame 41, whereupon the unitary structure 44 and the film strip carried in film holder 5 drop down upon the finger with the requisite pressure (as shown in dotted lines in FIG. 2). Timer 10 is actuated by the downward movement of frame 41 and, after a predetermined period of time, causes the solenoid 3 to be energized thereby causing unitary structure 44 to move rapidly upward from its fingerprinting position. In returning to its retracted position, frame 41 of structure 44 engages and raises arm 62 to open switch 11 thereby deenergizing the coil 35 and timer 10, and the inner end of the lever 53 reengages opening 59 thereby latching unitary structure 44 in retracted position. The film strip can then be advanced to bring a fresh portion of film into position to receive the next fingerprint or, in the case of an individual segment or strip of film, the film may be removed from the film holder 5 through either of the openings 31.

The density of the fingerprint recorded by the apparatus of this invention can then be measured with, for example, the apparatus and by the method disclosed in the co-assigned application Serial No. 154,467, filed November 24, 1961, entitled Measurement of Fingerprint Density Apparatus and Method.

While the apparatus is shown as being operated on alternating current, it will be understood that it could be modified to operate just as well using direct current.

It will be seen that with this apparatus the same contact pressure between the film strip and a finger is obtained regardless of the person operating the apparatus. The period of time during which the finger is in contact with the film is always the same due to the operation of the timer 10. Furthermore, the fingerprints recorded by the use of the apparatus of the invention are free of smudges due to the finger position guide and the rapidity with which the film is moved away from the finger after the desired time interval has elapsed.

In view of the above, it will be seen that the several objects of the invention are achieved and other advangtageous results attained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for recording a fingerprint on a strip of translucent material comprising a frame, means mounted within said frame for holding said strip for movement relative to said frame between a retracted position and a fingerprinting position, means for moving said strip holding means from said fingerprinting position to said retracted position, and means for releaseably holding said strip holding means in retracted position.

2. Apparatus for recording a fingerprint on a strip of translucent material as set forth in claim 1 wherein said means for moving said strip holding means from fingerprinting position to retracted position is rendered operative by timing means a predetermined period of time after said strip holding means is moved to said fingerprinting position.

3. Apparatus for recording a fingerprint on a strip of translucent material as set forth in claim 1 wherein said means for releaseably holding said strip holding means in retracted position comprises a latch.

4. Apparatus for recording a fingerprint on a strip of translucent material as set forth in claim 1, including timing means adapted to be actuated in response to movement of said strip holding means away from said retracted position and to render operative said means for moving said strip holding means from its fingerprinting position to its retracted position a predetermined period of time after movement of said strip holding means away from retracted position.

5. Apparatus for recording a fingerprint on a strip of translucent material as set forth in claim 1 including a guide for aligning the palmar portion of a finger with a strip of translucent material carried by said strip holding means.

6. Apparatus for recording a fingerprint on a strip of film comprising a frame, a film holder mounted within said frame for movement relative to said frame between a retracted position and a fingerprinting position, a solenoid for moving said film holder from said fingerprinting position to said retracted position, and means for releaseably holding said film holder in retracted position.

7. Apparatus for recording a fingerprint on a strip of film as set forth in claim 6 wherein said solenoid is energized by timing means to move said film holder from fingerprinting position to retracted position a predetermined period of time after said film holder is moved to said fingerprinting position.

8. Apparatus for recording a fingerprint on a strip of a film as set forth in claim 6 including timing means adapted to be actuated by the movement of said film holder away from retracted position and to energize said solenoid a predetermined period of time after movement of said film holder away from retracted position.

9. Apparatus for recording a fingerprint on a strip of film as set forth in claim 8 including a guide for aligning the palmar portion of a finger directly below the strip of film carried by said film holder.

10. Apparatus for recording a fingerprint on a strip of film as set forth in claim 9 wherein said means for releasably holding said film holder in retracted position comprises a latch.

References Cited in the file of this patent
UNITED STATES PATENTS

| | | |
|---|---|---|
| 1,225,500 | Rosino | May 8, 1917 |
| 2,104,586 | Freudenheim | Jan. 4, 1938 |